March 13, 1928.
N. A. YUILLE
DREDGER PIPE LINE
Filed Jan. 19, 1927
1,662,178
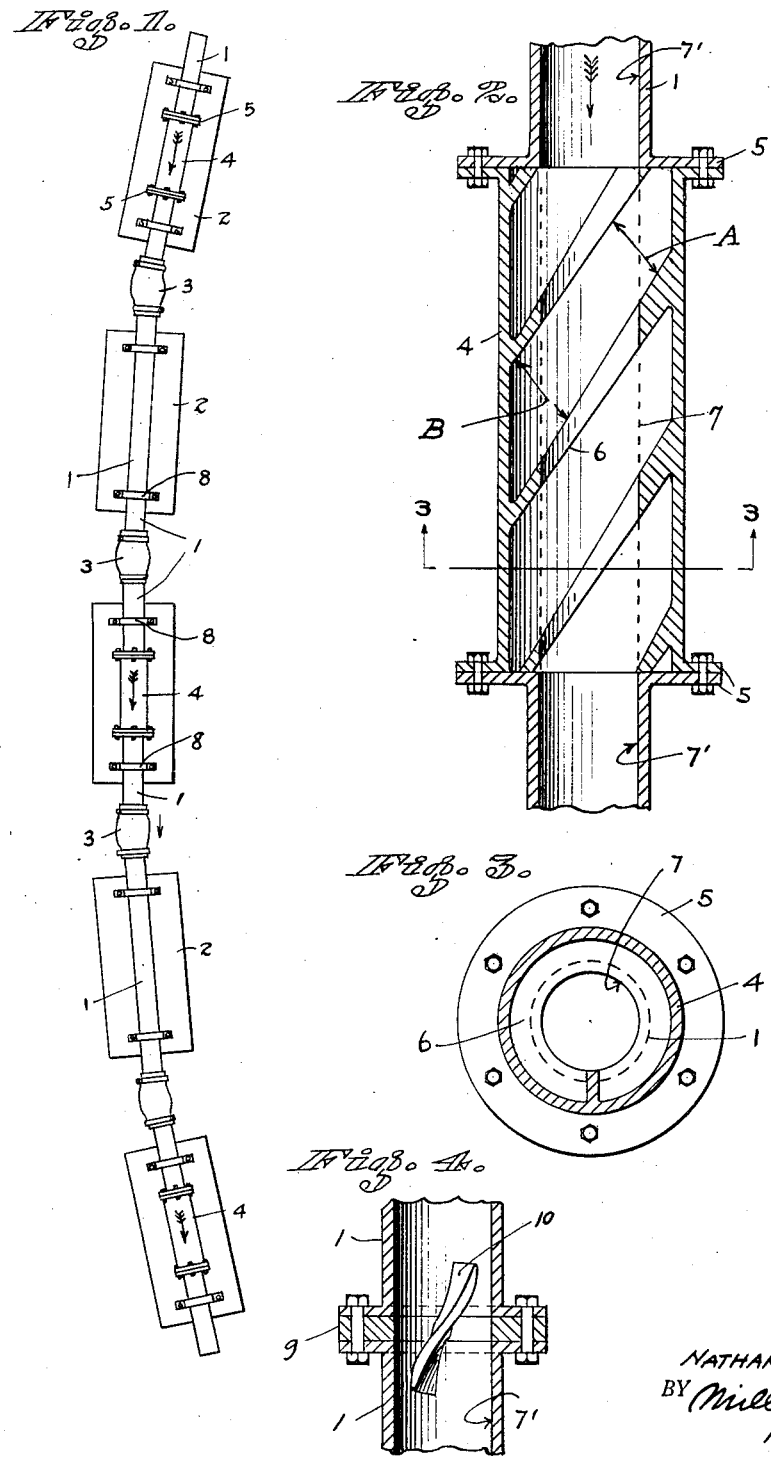
INVENTOR.
NATHANIEL A. YUILLE
BY Miller & Boyken
His ATTORNEYS.

Patented Mar. 13, 1928.

1,662,178

UNITED STATES PATENT OFFICE.

NATHANIEL A. YUILLE, OF SAN FRANCISCO, CALIFORNIA.

DREDGER PIPE LINE.

Application filed January 19, 1927. Serial No. 162,035.

This invention relates to pipe lines as used in connection with suction dredgers, and through which pipe lines, sand mud earth, and small rocks dug up by the cutter are discharged by means of the usual suction mud pump.

The objects of the invention are to provide improvements in such pipe lines whereby the sand earth and rocks will not settle in the liquid mud being pumped through the pipes, which pipes are sometimes of great length and supported on pontoons.

In the drawings herewith I show my invention in its preferred form, Fig. 1 being a plan view of a dredger pipe line supported on pontoons, the pipes being connected with rubber joints or sleeves and with my improved feature mounted as part of the pipe on every other pontoon.

Fig. 2 is an enlarged horizontal section of the improved pipe feature.

Fig. 3 is a transverse section of the device of Fig. 2 as seen from the line 3—3 thereof.

Fig. 4 is an enlarged transverse section of a flanged pipe joint with a modification of my improvement interposed between the ends of the pipes.

In the views of the drawing the sections of pipe are indicated at 1, the pontoons 2 each supporting a length of pipe, and the pipes connected by rubber sleeves or joints 3 strapped or clamped to the ends of the pipes in the well known manner.

On alternate pontoons at 4 is shown a special section of pipe of larger outside diameter than the regular sections 1 of the pipe line and suitably flanged at 5 and bolted to the regular sections.

This special section 4 is preferably made of cast iron, tho it may be of sheet steel, and is formed within with a spiral fin 6 having an internal clear opening 7 substantially equal in diameter to the clear opening 7' of the regular pipe sections 1.

This spiral fin 6 is preferably of multiple lead as indicated in Fig. 2 and the convolutions change in thickness from one end of the section toward the other so as to gradually increase the space between the convolutions, the distance "A" in Fig. 2 being less than distance "B", so that material in being pumped through the pipe in direction indicated by the arrow will not become wedged between the spirals but will ever tend to free itself as the space widens out.

These special sections are supported each on a pontoon as shown and held in place by the straps 8 clamping the main pipes to the boats, but when used to pass over land or rigid structures the pipe line with my sections in position may dispense with the straps.

An alternative construction is shown in Fig. 4 wherein two flanged ends of pipes 1 have bolted between them a very short section of pipe 9 taking the form rather of a heavy flange, and in which is firmly secured one or more spiral fins as at 10.

In operation, the mixed material under pressure passing through the pipe is given a spiral twist at spaced intervals each time it passes a section 4 or 9, thus keeping the mass stirred up and preventing harmful settling and packing of the sand, rocks and clayey material at the bottom of the pipe.

The enlargement of section 4 over the regular run of pipe, and preservation of the main channel 7 always equal to the main pipe opening 7' avoids congestion of the material in the spiral sections 4.

Such spaced arrangement of the spiral section is more economical than a continuous series of spiral fins throughout the pipe, greatly reduces the friction of the flowing mass, thereby conserving power, produces a quicker flow, yet effects the desired spiral agitation to prevent settling or separation of the mass as described.

I claim:

1. A flanged section of dredger pipe provided internally with a spiral fin, said section being aligned with and secured to a length of pipe having a plain bore, and said spiral fin having a bore or internal free space substantially equal to the bore of said length of pipe.

2. A section of pipe provided internally with a spiral fin, said fin being of multiple lead and of increasing thickness from one end of the pipe section to the other.

3. A dredger pipe line comprising sections of rigid pipe connected by flexible joints and alternating rigid sections provided with a spiral fin in a portion of their lengths only.

4. A pipe provided with an internal rifling spiral fin, the space between the spirals increasing in size toward one end of the pipe.

NATHANIEL A. YUILLE.